US007253551B2

(12) United States Patent
Madanshetty

(10) Patent No.: US 7,253,551 B2
(45) Date of Patent: Aug. 7, 2007

(54) APPARATUS TO PRODUCE ACOUSTIC CAVITATION IN A LIQUID INSONIFICATION MEDIUM

(75) Inventor: Sameer I. Madanshetty, Manhattan, KS (US)

(73) Assignee: Uncopiers, Inc., Manhattan, KS (US)

( * ) Notice: Subject to any disclaimer, the term of this patent is extended or adjusted under 35 U.S.C. 154(b) by 0 days.

(21) Appl. No.: 11/241,961

(22) Filed: Oct. 4, 2005

(65) Prior Publication Data

US 2006/0027254 A1 Feb. 9, 2006

Related U.S. Application Data

(63) Continuation of application No. 10/153,903, filed on May 24, 2002, now abandoned, which is a continuation of application No. 09/488,574, filed on Jan. 21, 2000, now Pat. No. 6,395,096.

(60) Provisional application No. 60/116,651, filed on Jan. 21, 1999.

(51) Int. Cl.
*H02N 2/00* (2006.01)

(52) U.S. Cl. ........................ 310/311; 134/184; 134/902

(58) Field of Classification Search ................ 134/184, 134/902
See application file for complete search history.

(56) References Cited

U.S. PATENT DOCUMENTS 3,315,102 A * 4/1967 Quint et al. ................ 310/317
3,371,233 A * 2/1968 Cook ......................... 310/317
4,193,818 A * 3/1980 Young et al. .................. 134/1
5,681,396 A * 10/1997 Madanshetty ............... 134/1.3
5,906,687 A * 5/1999 Masui et al. ................. 134/1.3
5,931,173 A * 8/1999 Schiele ..................... 134/57 R
6,311,702 B1 * 11/2001 Fishkin ...................... 134/1.3
6,948,843 B2 * 9/2005 Laugharn et al. ........... 366/127

FOREIGN PATENT DOCUMENTS

GB 1 331 100 * 9/1973
JP 10-277508 * 10/1998
SU 1378947 * 3/1988

* cited by examiner

*Primary Examiner*—Frankie L. Stinson
(74) *Attorney, Agent, or Firm*—McIntyre Harbin & King LLP

(57) ABSTRACT

An apparatus to produce acoustic cavitation by controlling cavitation events in a liquid insonification medium utilizing a waveform to excite a transducer with a series of bipolar inharmonic tone bursts having medium recovery intervals between respective bursts so that the medium repeatedly recovers from cavitation events between bursts. The apparatus may be used to clean a semiconductor wafer, to de-coat a painted surface having, to induce a chemical reaction, and/or to provide recycled paper made from inked paper de-inked by cavitation. Cavitation events are generated using a transducer and a waveform generator, e.g., square wave tone bursts, to excite the transducer with a signal controlled in frequency, burst repetition rate, duty-cycle and/or amplitude, e.g., utilizing bursts having a frequency between 500 KHz and 10 MHz, and a duty cycle between 0.1% and 70%.

5 Claims, 6 Drawing Sheets

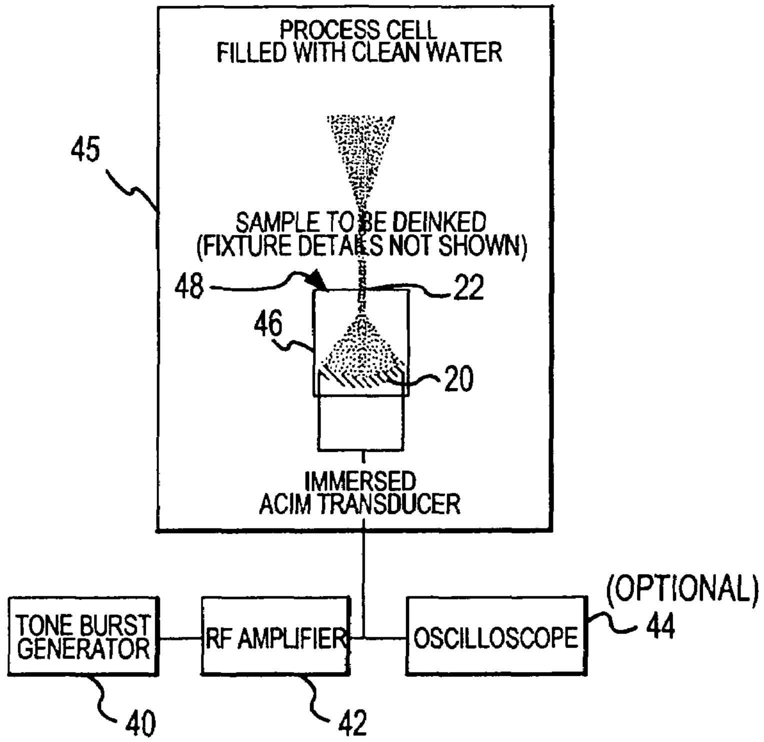
FIG.(1a)
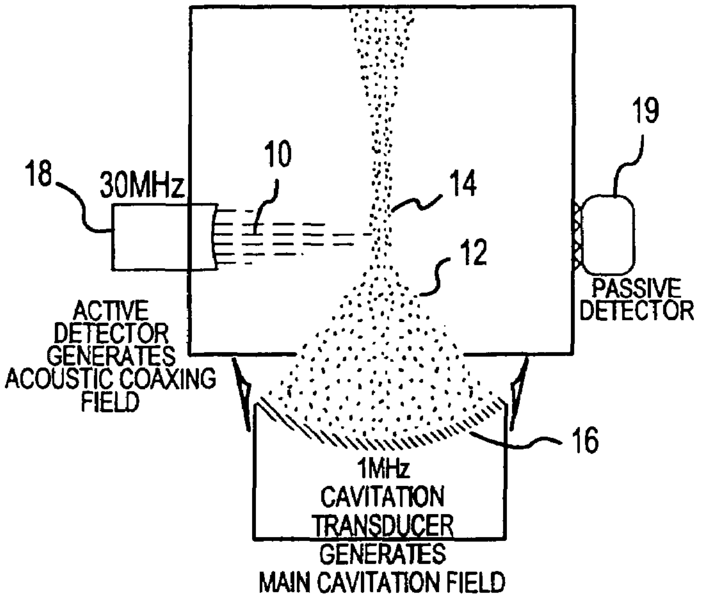
PRIOR ART
FIG.(1b)

APPARATUS TO PRODUCE ACOUSTIC CAVITATION IN A LIQUID INSONIFICATION MEDIUM

CROSS-REFERENCE TO RELATED PATENTS AND PATENT APPLICATIONS

This invention is a continuation of commonly-owned, U.S. application Ser. No. 10/153,903 filed May 24, 2002 now abandoned, which is a continuation of U.S. application Ser. No. 09/488,574 filed Jan. 21, 2000 (now U.S. Pat. No. 6,395,096) claiming the benefit of provisional application Ser. No. 60/116,651 entitled "Single Transducer System for Submicron Particle Detection and/or Removal" filed Jan. 21, 1999

This invention is also related to U.S. Pat. Nos. 5,594,165 and 5,681,396, which disclose microcavitation for submicron particle detection and removal.

BACKGROUND OF THE INVENTION

This invention relates to acoustic cavitation, but more specifically, to an apparatus to produce acoustic cavitation using a single transducer to subject an article or component thereof to microcavitation events generated in a liquid insonification medium.

Acoustic microcavitation, which is the inducement of micron or sub-micron size bubbles in a liquid or fluid medium that survive a few microseconds or less, is to be contrasted with ultrasonic, megasonic, and cyrogenic aerosol cleaning methods. Microcavitation has been used on a limited scale or conceived for use in microparticle or subnanometer particle detection in ultrapure liquids, submicron particle eviction from silicon wafers, deinking of recyclable paper, paint removal, surgical procedures, destructive and non-destruction testing and measuring, thin film processing applications, etc.

Previously, at least two transducers were required to initiate and maintain cavitation. Prior ACIM was induced using a low frequency, high intensity primary acoustic field and a higher frequency, low intensity coaxing acoustic field. To effect ACIM, the two fields were substantially simultaneously directed at a site of a workpiece or object. It was crucial that at least part of the high frequency acoustic waves in the fluid medium pass the desired ACIM site precisely when the tensile part of the low frequency waves was present at the site. In this arrangement, it sometimes became unwieldy to articulate two transducers of different frequencies to achieve the desired ACIM zone, stationary or moving, where the different acoustic fields were to be synchronized and collocated.

Therefore, a need has arisen to simplify ACIM apparatuses and techniques to make them more practical to apply to the various applications identified herein.

In general, cavitation is the formation of cavities or bubbles in a liquid where the ensuing bubble dynamics and energy concentration result in implosive collapse of bubbles that achieve unique and surprising results. In the design of mechanical systems, cavitation has known destructive effects and therefore, was avoided. Cavitation remains enigmatic today as it was when Lord Rayleigh first investigated cavitational erosion of propellers almost a century ago. Cavitation is a mature subject and an encylopedic collection of information on acoustic cavitation is compiled in "Acoustic Bubble" by Tim Leighton (1997). Hydrodynamic cavitation is discussed in "Cavitation and Multiphase Flow Phenomena" by Frederick Hammitt (1980). Whether induced acoustically or associated with hydrodynamic flows, the mechanics and effects of cavitation are essentially the same. Acoustic cavitation has was also exhaustively reviewed by Flynn (1964), Neppiras (1979), Apfel (1981) and Prosperetti (1986).

Consider, for example, a free bubble in the path of a sound wave. In response to the sound wave, the bubble expands and contracts, and the energy mechanically stored during expansion is released in a concentrated manner during implosive collapse of the bubble. Should the bubble grow to about two and a half times its nominal or equilibrium size during negative excursions of acoustic pressure, then during the following positive half cycle of pressure, its speed of collapse could become supersonic (Lauterborn, 1969) thereby releasing excess energy that catastrophically explodes the bubble. Such almost single cycle violent events are called transient or inertial cavitation, and may explain the energetic manifestations of cavitation which, among other things, are useful for surface erosion or particle eviction.

Unlike dramatic bubble growth within a single acoustic cycle seen in transient or inertial cavitation, there exists a more gradual process, termed rectified diffusion. Under favorable conditions, a small bubble exposed to a continuous sound wave tends to grow in size if rectified diffusion is dominant. According to Henry's law, for a gas soluble in liquid, the equilibrium concentration of dissolved gas in the liquid is directly proportional to the partial pressure of the gas above the liquid surface, the constant of proportionality being a function of temperature. When the bubble expands, the pressure extant at the bubble's interior falls and gas diffuses into the bubble from the surrounding liquid. When the bubble contracts, the pressure in the interior increases and the gas diffuses into the solution of the surrounding liquid. The area available for diffusion, however, is larger in the expansion mode than in the contraction mode. Consequently, there is a net diffusion of the gas into the bubble from the surrounding liquid over a complete cycle, which causes bubble growth due to rectified diffusion.

However, a bubble can grow only up to a critical size—to a resonance radius determined by the frequency of the impressed sound wave. For small amplitude oscillations, a bubble acts like a simple linear oscillator of mass equal to the virtual mass of a pulsating sphere, which is three times the mass of displaced fluid. Stiffness is primarily given by the internal pressure of the bubble times the ratio of specific heats. Surface tension effects are, however, significant for small bubbles. Following Minnaert (1933) and ignoring surface tension, there is a simple relation for the resonance radius of air bubbles in water:

$$(\text{Resonance radius in } \mu\text{m})\times(\text{insonification frequency in MHz})=3.2$$

This relation is valid within 5% even for a bubble radius of about 10 μm. Bubble response becomes increasingly vigorous at the resonance radius, and is limited by damping mechanisms in the bubble environment—e.g., viscous damping, acoustic radiation damping, and thermal damping. A post-resonance bubble may exhibit nonlinear modes of oscillations, or become transient if the applied acoustic pressure amplitude is adequately high.

The above discussion presupposes the presence of a free bubble in the path of a sound wave. Free bubbles, however, do not last long in a body of water. Larger ones are rapidly removed due to buoyancy and the smaller ones dissolve even in nearly saturated water. While a 10 μm air bubble rises in water at a terminal speed of 300 μm/s, it can survive for about five seconds before dissolving completely. Dissolution is driven essentially by the excess pressure inside the bubble due to the surface tension.

It is very difficult to cavitate clean liquids (Greenspan and Tschiegg, 1967). A pure liquid purged of particulate impurities and stored in a perfectly smooth container can attain its theoretical tensile strength before undergoing cavitation or fracture. Under ideal conditions, water can be as strong as aluminum. The tensile strength of water based on the homogeneous nucleation theory exceeds 1000 bars. In cavitation studies, tensile strength is often quoted in terms of negative pressures, and cavitation threshold is understood as the pressure amplitude at which the first occurrence of cavitation is detected. Observed strengths (thresholds) in practice, however, are very much lower, rarely exceeding a few bars for reasonably clean liquids. This is because there exist gas pockets within the liquid which provide the necessary seeding for cavitation to occur at lower pressures.

A gas or cavitation site is often stabilized in a crevice (Harvey et al., 1944), either in a container wall or on a fluid-borne particle. Incomplete wetting traps gas at the root of a sharp crevice, stabilizing it against dissolution. Unlike a free bubble, though, surface tension in this case acts on a meniscus which is concave towards the liquid. Over-pressuring the liquid for sufficient duration prior to insonification can force the meniscus further into the crevice thereby causing full wetting of the crevice, which then gives rise to increased cavitation thresholds.

Until recently most acoustically generated, cavitation employed for cleaning applications, primarily used standing waves generated in a bath of liquid in which objects to be cleaned were immersed. In such ultrasonic cleaners, acoustic frequencies used were typically between 20 kHz to 100 kHz. Some implementations used propagating pulse trains instead of standing waves to improve cleaning efficiency, to minimize hot spot damage, and to reduce power consumption. Even so, when these applications were extended to semiconductor applications, cavitation was deemed detrimental to the delicate wafer surfaces, which spawned the use of megasonic cleaning to avoid cavitation (e.g. U.S. Pat. No. 4,854,337 to Bunkenburg et al., 1989; U.S. Pat. No. 4,979,994 to Dussault et al., 1990; U.S. Pat. No. 5,247,954 to Grant et al., 1993; and U.S. Pat. No. 5,355,048 to Estes, 1994) thus teaching the use of frequencies in the range of high kilohertz or low megahertz (typically 1 MHz).

Such high frequencies were used because it was believed that cavitation does not occur at higher frequencies. Quoting from the recent book edited by Takeshi Hattori (1998) titled, "Ultraclean Surface Processing of Silicon Wafers—Secrets of VLSI Manufacturing;" "[w]hen the oscillation frequency is 1 MHz or above, cavitation no longer occurs." It is precisely the supposed inability of generating cavitation at low megahertz frequencies that such high frequency acoustics were used in diagnostic ultrasound for medical imaging and fetal monitoring. As a further precaution to preclude bubble growth that may occur due to continuous wave insonification, diagnostic instruments deployed short pulses at low duty cycles, e.g., 1%, which incidentally also facilitates the pulse echo method of information collection essential for their function. Therefore, prior systems rely on using high frequency tone burst acoustics, such as 1 MHz, when the explicit objective is to avoid the occurrence of cavitation.

Microcavitation, i.e., the inducement of micron or sub-micron size bubbles in a liquid or fluid medium that survive a few microseconds or less, occurs if the pressure amplitude in the acoustic beam is significantly greater than a threshold value, and if appropriate cavitation nuclei are present. In the absence of cavitation nuclei, water-like liquids cannot be fractured or cavitated by pressure amplitudes of less than 1000 bars peak negative, the threshold for homogeneous nucleation of water at standard temperature and pressure (STP), which corresponds to an atomic or molecular size vacancy or cavity in the liquid bulk caused by thermal, stochastic density fluctuations. Stronger tensile pressures are needed to cavitate smaller bubbles or cavitation nuclei. A 60-atmosphere peak negative pressure wave, for example, might cavitate a 50-nanometer bubble nucleus.

Planar piezoelectric transducers cannot generate very high pressure amplitudes with moderate power inputs. With increased power, however, cavitation might occur on the surface of the transducer crystal itself which will cause destruction of the crystal. By using focused transducers, however, it is possible to achieve additional pressure amplification by virtue of the focusing action at a particular site. Even so, high intensity acoustic waves invariably become non-linear because of inherent properties of the propagation medium. The nonlinearity in shape manifests an enhanced compressive peak and reduced tensile peak of the wave pulse. Cavitation at a nucleation site cannot occur if the tensile part of the wave is not stronger than the threshold value. If the nonlinear pulse is reflected at a pressure release boundary, then phase reversal takes place and the compressive peak reflects as a tensile peak and vice versa.

Using reflected nonlinear waves, it becomes easier to bring about cavitation because now a stronger tensile peak is available. U.S. Pat. No. 5,523,058 to Umemura et al. obviates the need for using suitable reflecting structures to achieve enhance tensile peaks by using two resonant transducers—one driven at a fundamental frequency and the second driven at a second harmonic frequency, and then superposing them in proper phase relation between the fundamental driving frequency pulse wave and its second harmonic wave to obtain a resultant pulse with enhanced tensile peak and weakened compressive peak. This method of generation, like other methods of cavitation in the past, also relies on the availability of appropriate cavitation nuclei in the insonified medium. Without the presence of appropriate nuclei the tensile peak is ineffective in causing cavitation.

Although Umemura teaches that "the efficiency of cavitation generation depends on the relative phase relation between a fundamental wave and a second harmonic" wave and he is able to access smaller bubble sizes (half the resonant bubble size corresponding to the fundamental frequency), he still relies on the availability of appropriate bubbles or bubble bearing crevice structures in the liquid host to initiate cavitation.

Further, Umemura does not use too high frequencies at which cavitation ordinarily does not occur. It is known in the art that transducers generating high pressure amplitudes at high frequencies are technologically unfeasible (high frequency resonant crystals are necessarily thin and cannot support stresses needed for generating high pressures), and yet to generate cavitation at high acoustic frequencies, the pressure amplitudes necessary are excessive.

In attempting to clean effectively throughout a cleaning tank, Honda (U.S. Pat. No. 5,137,580, 1992) uses at the bottom of the tank a Langvin type resonator with two resonating segments, and drives them alternately at the two resonance frequencies for periods of up to several milliseconds, which are adequate to setup standing wave fields in the liquid. At the lower frequency, a standing wave field causes large bubble cavitation to populate at pressure antinodes to form bubble bands at specific levels in the tank. At higher resonance frequency, Honda supposes that these bubbles cavitate and collapse to cause some measure of cleaning, but more importantly, because the standing wave pattern is broken, the previously structured bubble bands move upwards due to buoyancy and radiation forces to bring about some cleaning.

Honda suggests that these large bubbles will break down at higher frequencies and fill the tank with smaller bubbles. In actuality, the higher frequency waves merely reflect off the larger bubbles. A given frequency cannot significantly affect larger bubbles not corresponding to the characteristic resonance size. When the low frequency is again switched on, these small bubbles nucleate large bubble cavitation whose fragments will serve a next sweep by the higher frequency. Most cleaning is expected to be done by the large bubble cavitation effervescing throughout the extent of the tank. Honda does not explicitly state the frequencies he is using but the Langevin sandwich type transducer and the kind and scale of cavitation he mentions leads one to believe that he must be using acoustics in the low kilohertz range, between 20 kHz to 60 kHz.

If Honda were to use only one frequency, he would obtain a banded structure in the tank, and once the bubbles are setup in their locations, no significant cavitation would be sustained and no further cleaning effect would ensue due to occurrence of bubble effervescence. While Honda also teaches farming effectively available bubble fields for cavitation between two frequencies, Murry, before Honda taught how to cultivate bubble fields starting from the smallest of bubbles that he suggests are available in the liquid. Murry (U.S. Pat. No. 3,614,069, 1971) in his patent "Multifrequency Ultrasonic Method and Apparatus for Improved Cavitation, Emulsification and Mixing" teaches that operating on the assumption there will always be some very small bubbles in the bulk medium, insonification starts with using continuous wave insonification of a very high frequency corresponding to which the supposed pre-existing small bubbles are resonant. Near resonant bubbles exposed to continuous acoustic stimulus will respond by growing due to rectified diffusion. To continue this bubble growth they will have to be insonated by progressively decreasing the drive frequency. This downshifting insonification is achieved by using broadband transducers, not resonant transducers.

As the bubbles grow by downshifted continuous wave insonification, Murry applies a low frequency intense field to cavitate these bubbles. He upshifts or upconverts this low frequency to high intensity field so as to capture and cavitationally collapse any slightly smaller bubbles that may exist, as not all bubbles grow uniformly and simultaneously to a given size. Murry, operating on the assumption that very small bubbles exist in the liquid, concentrates on cultivating appropriate size bubbles by continuous wave insonification. Such bubbles are gas-filled as a result of rectified diffusion, they are not vacuous or nearly empty. Implosion of gas-filled bubbles is less energetic because the collapse is cushioned by the cavity contents.

Starting from a few tiny seed bubbles whose existence is assumed, Murry cultivates bubble fields with bubbles progressively growing over time in response to frequency downshifted insonification, and then violently collapsing them by applying low frequency high intensity acoustic field, the latter being subsequently upshifted in frequency to harvest all possible bubbles for cavitation. He uses two broad-band transducers to facilitate frequency shifting, and even interchanges the roles of the bubble grower and bubble exploder transducers for appropriate cycling and sustaining cavitation throughout the extent of the bulk being processed for emulsification or mixing.

In summary the prior art teaches that a perfectly clean liquid absent of bubbles or bubble-like structures cannot be easily cavitated. To bring about cavitation in ultra clean hosts, especially at high frequencies, is almost impossible primarily because the acoustic drivers, the piezoelectric transducers used to generate cavitation cannot be made to generate high pressure amplitude sound waves at high frequencies. It is possible to a limited extent to generate high tensile pulses, but only with reduced compressive pulses if one drives the transducer in both fundamental and second harmonic excitation in precise phase relationship.

To achieve this, one must use two transducers. In resonant mode excitation, the transducer can only be driven at odd harmonics of the fundamental frequency. Even if one is able to obtain high pressure amplitude at high frequency, one needs to assume that a population of small bubbles always exist in a liquid, then insonifying the liquid medium with continuous acoustic waves of appropriately high frequency, frequency specific to excite resonance in the bubbles, can grow the bubbles to a larger size through rectified diffusion, whence subsequent insonification by a lower frequency of sufficient intensity one can bring about cavitation. Being gas-filled these long-lived bubbles cannot sufficiently implode to create high energy density points in the medium, and are thus ineffective to bring about the effects of ACIM described herein.

It is known in physics of liquids that free bubbles in a liquid are unstable and do not survive for any significant duration after their creation. Larger bubbles rise and escape out of the liquid because of buoyancy, while smaller bubbles dissolve due to surface tension forces which are dominant for small bubbles. Any bubble-like structure that survives in liquid has to be anchored in a crevice like feature in a solid, e.g., a wall or liquid-borne particle. Not all liquid borne particles are capable of supporting such partially wetted crevices, particularly, smooth spherical particles cannot harbor such gas-filled cavities.

Apart from the inventor's own work, the teachings of the entire prior art appears to rely on cavitation as a chance dominated phenomenon. In addition, it is not taught or suggested in the prior art how to create cavitation nuclei when none exist a priori, and then to control such cavitation after onset.

Therefore, to achieve useful applications provided by the present invention in a practical and convenient manner, prior systems and methods do not take into account: (i) how to activate or nucleate a cavitation event from a particle, regardless of whether or not it has a gas bearing crevice, (ii) how to acoustically activate or nucleate cavitation amongst particles, however, small they may be, or whatever be their composition or surface morphology, (iii) consideration of the number of times a cavitation event ensues in relation to a given or created gas bearing crevice and/or point phase boundary, or (iv) attaining vacuous cavitation to the maximum extent possible rather than gaseous cavitation.

In vacuous cavitation the cavity is nearly empty. Only transiently (or inertially) generated cavitation involves vacuous cavities. Cavitation generated by continuous waves is gaseous cavitation. Only vacuous cavitation can be imploded, unimpeded, unto a point, and hence, only vacuous cavitation can culminate in high energy density at points. To be able to implement items (i) through (iv) implies that cavitation is being constructively controlled in all phases—inception, evolution and intensity.

To the inventor's knowledge, the entire prior art concerns itself with cavitation as chance dominated phenomenon, and does not teach how to manage cavitation in a practical and efficient way to perform a useful purpose, except in the inventor's two recent U.S. Pat. Nos. 5,681,396 (1997) and 5,594,165 (1997), which deal with acoustic coaxing methods for constructive control of the cavitation phenomenon using confocal transducers.

ACIM methods described herein, on the other hand, employ a single transducer to more effectively control the onset, evolution and intensity of microcavitation. Generating ACIM with a single transducer enables expanded utility including, improved deinking of paper (e.g., removal of bonded, laser printed Xerox ink, i.e., toner-based ink compositions), practical depainting of surfaces (including selective removal of layers in a multi-layered painted surface (primer and/or top coat)), thin film strength testing and surface preparation prior to thin film deposition; semiconductor wafer cleaning; improved microparticle detection in clean liquids; improved particle removal for precision cleaning of delicate surfaces; and better particle size control in the preparation of nanometer particles like gold sols. In addition, improved ACIM methods and apparatuses of the present invention may be used to erode metallic surfaces, help shatter kidney stones, accelerate chemical reactions and even lead to light production, i.e., sonoluminescence.

SUMMARY OF THE INVENTION

The invention comprises a device that produces vacuous cavitation in a liquid medium comprising a single transducer; an energizing source that powers the transducer with a bipolar inharmonic tone burst signal that produces an acoustic field in the medium wherein the tone burst signal has a duty cycle that defines on and off burst intervals thereby to produce cavitation in the medium having multiple high frequency and multiple lower frequency acoustic field components; a controller that controls at least one of a duty cycle, amplitude, and frequency of said tone burst signal; and a housing that provides acoustic coupling between said transducer and a workpiece through said medium In another embodiment, the invention comprises an apparatus to produce acoustically induced cavitation relative to an object in a liquid insonification medium wherein the apparatus comprises a single-transducer resonant mode transducer module that operates in a thickness direction; a communicating path between said transducer module and the object within a continuum of said insonification medium thereby to establish an acoustic coupling between the transducer module and the object; an excitation source that supplies said transducer module with a waveform comprising a series of bipolar inharmonic tone burst signals having on and off burst intervals to produce within the medium about the object an acoustic cavitation field effect; and a controller to control at least one of duty cycle, frequency, and amplitude of said tone burst signals to effect induction of vacuous cavitation within said insonification medium.

Other features and aspects of the invention include, but are not limited to, controlling or varying the waveform source in waveform shape, frequency, duty cycle, tone burst repetition rate, amplitude or other parameters. The invention, though, is pointed out with particularity by the appended claims.

BRIEF DESCRIPTION OF THE DRAWINGS

FIG. 1(*a*) shows an exemplary ACIM apparatus including a waveform source, a transducer, a liquid or fluid medium, a delivery mechanism, and a workpiece or surface subjected to ACIM in accordance with the present invention.

FIG. 1(*b*) shows a prior art ACIM apparatus comprising a pair of confocal high frequency and low frequency transducers to produce an ACIM field.

FIG. 4(*b*) is a perspective view of an elongated transducer module in accordance with the present invention.

DESCRIPTION OF ILLUSTRATIVE EMBODIMENTS

Acoustic coaxing induced microcavitation (ACIM) methods and apparatuses described herein may be used to control microcavitation at point solid boundaries of an object or workpiece to perform work on the object; examine free bubbles in a fluid or liquid for testing or measuring; induce or assist a chemical reaction; or perform other scientific, industrial, or medical tasks. ACIM tools may be constructed to perform abrasion, cutting, drilling, or other action with respect to a variety of organic and inorganic materials, including tissue and bone.

Figure 2:
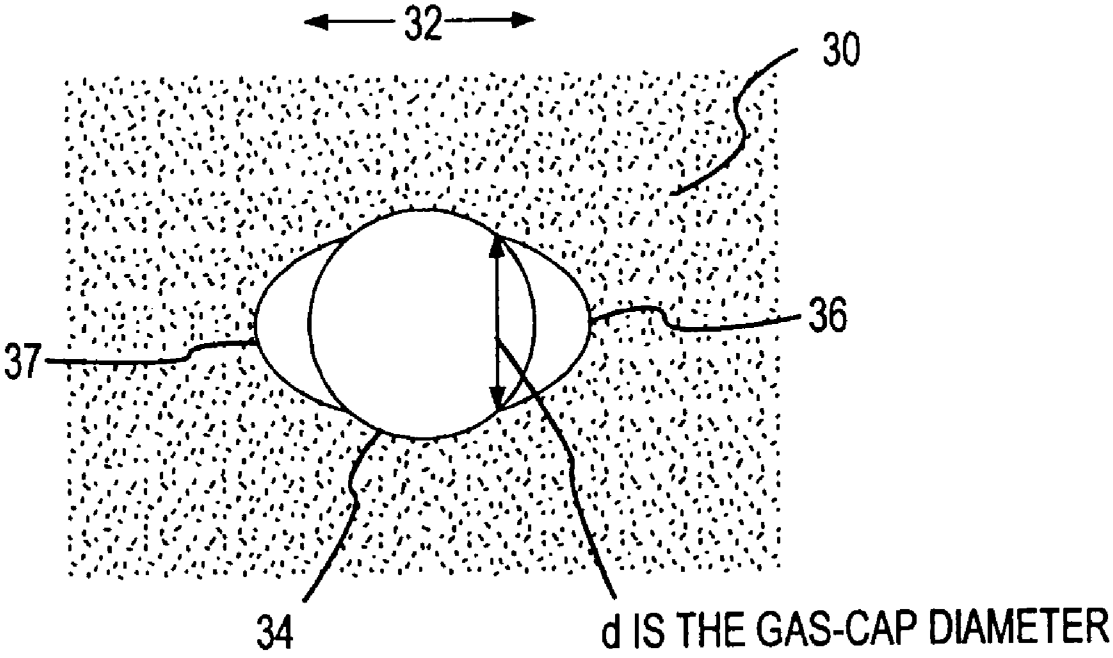
FIG. 2 illustrates dynamics of gas cap formation on a particle subjected to ACIM acoustics that initiates microcavitation.

Controlled ACIM enables one to control the onset, evolution, and intensity of acoustic microcavitation stemming from the creation of new nuclei or the presence of available cavitation nuclei in a liquid medium, such as de-ionized or tap water. Such nuclei may come from free bubbles or from liquid-borne solid particulates with crevice-like features that stabilize significant gas pockets. Suspended particulates may include sub-micron polystyrene particles (e.g., 0.984 micrometer mean diameter), silica, dust, etc. that enhances the presence of cavitation nuclei for enhanced cavitation. Ordinarily only a small fraction of the particles present in a host medium (liquid, fluid, gel, or other acoustic propagation medium) is capable of harboring stabilized gas pockets that serve as potential cavitation nuclei. Smooth spherical particles as illustrated in FIG. 2, for example, do not easily nucleate cavitation because they have no significant crevices to support gas pockets. Microcavitation, therefore, is a chance dominated process primarily dictated by the presence of adventitious motes. ACIM, however, can cultivate cavitation nuclei where none existed before.

FIG. 1(*b*) shows a prior art system where microcavitation was brought about by the coordinated confluence of beams (i.e., alignment in space and time) of two separate acoustic fields 10 and 12 deployed substantially simultaneously in space and time at a desired ACIM site 14. Acoustic field 12 was produced by a focused, e.g., sectioned spherical or parabolic, piezoelectric transducer 16 of low frequency and high intensity, and the second acoustic field 10 was produced by a second transducer 18 operating at high frequency but low intensity. Low frequency transducer 16 produced an acoustic field of about one megahertz and high frequency transducer 18 produced an acoustic field of about thirty megahertz. Each transducer was operated by applying a sinusoidal driving voltage at its fundamental resonance frequency, in tone bursts of low duty cycle, and by directing their respective acoustic fields upon the surface of a workpiece at site 14. This arrangement provided only limited utility due to limitations on the size of the ACIM site 14, and complexity and physical constraints of the transducers 16 and 18, e.g., requirement of spatial and temporal coincidence as well as alignment of acoustic fields, limited latitude control of ACIM, and other limitations.

FIG. 1(*a*) depicts one arrangement of the present invention where a single transducer 20 efficiently produces coaxing high and low frequency acoustic fields at a site 22. The exemplary ACIM apparatus of FIG. 1(*a*) comprises a tone burst generator 40, an RF amplifier 42, an optional oscilloscope 44, transducer support 46, a fluid chamber 45 in which the support 46 and transducer 20 are immersed, and a fixture 48 for supporting a workpiece at coaxing site 22.

Use of a single transducer 20 facilitates control of the onset, evolution, and intensity of ACIM events to achieve more useful industrial, scientific and medical applications. A key factor required in acoustic coaxing is that the frequency (MHz) pressure (peak negative bars) product is maintained above a certain value (typically greater than 5 Mhz-bars). ACIM is achieved by driving transducer 20 not only with "sinusoidal" signal but also with a complex waveform, such as square wave tone bursts (FIG. 3) where duty-cycled controlled bursts have Fourier components that produce a combination of acoustic fields which, when converged at ACIM site 22, produce substantially the same or similar effect as multiple acoustic fields generated by prior art confocal transducers 16 and 18 of FIG. 1(*b*).

Fluid chamber 45 may comprise a tank, reservoir, channel, conduit, nozzle, or other confine which couples the acoustic field with an object, workpiece, tissue, or surface and which confines the liquid medium about the transducer and ACIM site 22. In transducer support 46, the liquid medium fills the space between the transducer 20 and the ACIM site 22. Liquid may be confined to the container, it could be made available as a liquid jet medium between transducer 20 and ACIM site 22, it may be contained by a sponge or other liquid retaining structure, or it may be a gel or any other medium that can undergo phase changes involving liquid (or liquid like) phase and gas phase (bubble like or vacuum). In some cases, to minimize the gel or liquid volume the ACIM transducer is coupled to the workpiece with an acoustic horn and using the liquid or the gel in the small gap between the horn and the workpiece surface.

Still referring to FIG. 1(*a*), generator 40 produces, for example, one megahertz square wave tone bursts (i.e., 10 μs pulse width) with a burst repetition rate of about one kilohertz. This differs from sinusoidal waves previously used. The duty cycle of the generator output may be controlled between about 0.1% to 50%. Higher duty cycles, e.g., up to 80 to 90%, can be used but may cause the transducer to overheat and lose its efficiency and transducing capacity. Lower duty cycles, on the other hand, improve cooling of the transducer. Conventional cooling systems, such an circulating the fluid medium through a heat exchanger, can also be used with ACIM. As indicated above, it is preferable to induce transient cavitation with newly formed bubbles in order to obtain a more intense and vigorous release of energy during implosion. Lower duty cycles enable recovery periods for bubble formation between burst repetitions. At duty cycles beyond 50%, cavitation tends to result also from rectified diffusion, e.g., gaseous, which results in lower intensity upon collapse of the bubbles due to the bubble's ingestion of gases from the surrounding medium, thus diminishing the overall intensity of energy release. For cleaning, particle eviction, or destructively removing particles from a surface, it has been found that only a few tone bursts are needed, which means that deinking of paper (substrate or bulk form), for example, will occur in a few milliseconds or less, or a fraction of a millisecond. Accordingly, most ACIM applications can be accomplished using very low duty cycles.

Thus, the intensity of cavitation at site 22 may be controlled the burst repetition rate and duty cycle of generator 40, and/or by controlling the gain of amplifier 42.

Square wave tone bursts produced by generator 40, for example, when Fourier-decomposed, yield harmonics with amplitudes decreasing inversely as the harmonic frequency increases. So a transducer driven with square wave tone bursts will contain odd harmonics (half wavelength thick acoustic transducers suppress even harmonics) with precisely reducing amplitudes while maintaining the frequency-pressure product uniform. Instead of using a square wave, other waveforms or harmonics may be selected and/or combined to achieve constructive control of cavitation. Thus, coaxing becomes more efficient, permitting one to use a single transducer to induce cavitation.

Instead of square wave tone bursts, microcavitation may be induced by generator 40 producing triangular waves for driving the transducer. This will produce all odd harmonics with a $1/N^2$ amplitude dependence. For efficient coaxing, 1/N dependence is appropriate, however, a coaxing effect can occur at any non-zero amplitude dependence of high frequencies. To attain coaxing effects, the transducer produces a range of acoustic intensity at the focal point, or in the effective coaxing zone, up to about ten kilowatts/cm$^2$ at lower frequencies to about several hundred watts/cm$^2$ at higher frequencies. Depending on the application, one may choose the required harmonics and amplitudes to be used. At high intensity, it is also possible to achieve coaxing effect merely by using fundamental excitation frequencies, e.g., a sinusoidal driving voltage.

To aid understanding of the invention, FIG. 2 shows bubble dynamics. Weak high frequency planar waves of about thirty megahertz and a pressure amplitude of 0.5 bar create very high accelerations ($6.5\times10^5$ g units) of particle 34 during the passage of sound wave 32 in the medium 30. As known, air is 830 times lighter than water—strong density contrast with respect to water host. At high acceleration in a reduced pressure environment, the tensile environment expropriates dissolved gas or vapor from the liquid onto the solid particle resulting in cavitation nuclei.

The onset of cavitation may be enhanced by adding particles to the medium 30, such as 0.984 μm, 0.481 μm, and 0.245 μm diameter smooth polystyrene latex particles; 0.784 μm silica particles variously sintered; and tap water with its natural particulate content—varying the dissolved air content of the host water. Varying the number density of particles present and different acoustic duty cycle settings invariably can achieve reduced microcavitation thresholds. Moreover, coaxing induced cavitation activity at or near threshold intensity is directly proportional to the particle number density in the test cell.

Strong density contrast combined with high acceleration enhances kinetic buoyancy effects, which further encourage formation of gas caps 36, 37 of diameter d on the oscillating particle 34. Unlike a free bubble in a liquid, the gas cap structure is provided by an isotropic tensile environment 30 surrounding the entrained particle 34, and not by the pressure of the cavity contents. In fact, the gas caps 36, 37 will be mostly vacuous, and only provide a necessary discontinuity that develops opposition between the surface tension forces anchoring along the contact perimeter and the tensile forces trying to pull the caps off. The particle 34 is much smaller compared to the acoustic wavelength and therefore experiences a uniform pressure over its extent—maximum particle size of 1 μm, wavelength in water a 1 MHz and 30 MHz are 1500 μm and 50 μm, respectively, and the particle 34 is fully entrained in the host fluid.

For cavitation to occur, the negative pressure p in the tensile environment of the low frequency cavitation field should overcome the surface tension σ (where surface tension force=σπd) acting on the contact perimeter of the gas cap 36, 37 is represented by:

$$\sigma\pi = p(\pi d^2/4).$$

Figure 3:
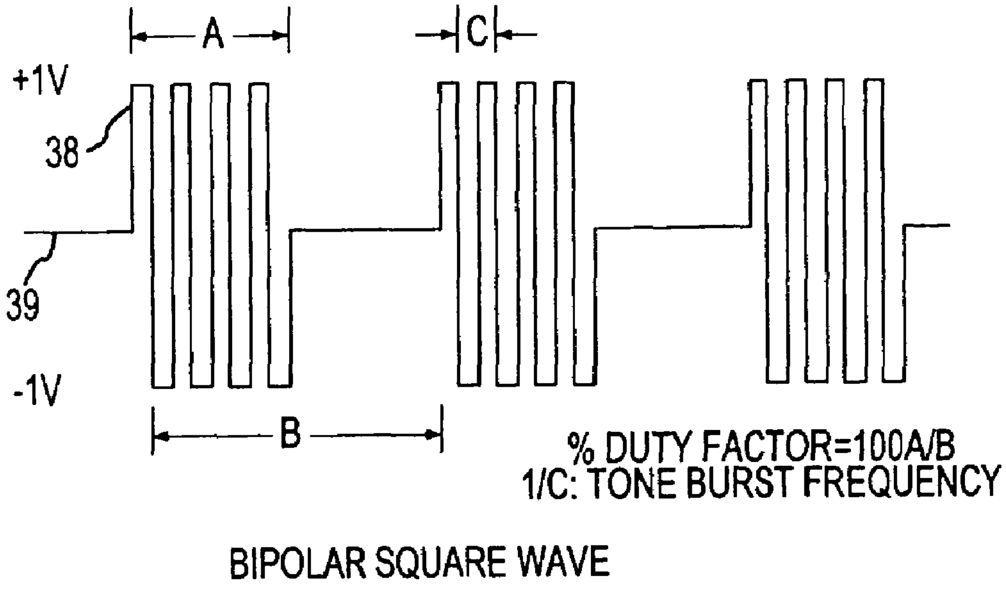
FIG. 3 depicts an exemplary tone burst waveform applied to the ceramic transducer of FIG. 1(*a*) for generating acoustic coaxing fields.

FIG. 3 shows the signal output of exemplary tone burst generator 40 (FIG. 1(*a*)), which is a square wave tone burst 38 of about 1 MHz (1/C) and a duty cycle (A/B) of about 1%. In the exemplary waveform, A=10 μs, B=1 millisecond, and C=1 μs. The value of these parameters may be widely varied without departing from the spirit of the invention, the objective being to excite a single transducer 62 with a waveform comprising harmonics that cause the transducer to produce an ACIM region. Generator 40 is capable of generating a bi-polar square wave with or without an adjustable baseline bias. Waveforms having other shapes, e.g., triangular, or a combination of waveforms of various shapes may be used provided they effect ACIM field generation by transducer 62. The frequency of the square wave during the "on time" may range between 500 kHz and 10 MHz (more or less), with one megahertz being generally used for ACIM. The waveform has a maximum open circuit voltage amplitude swing of one volt rms (peak-to-peak) before being suitably attenuated and applied to a 50-ohm input impedance of broadband (bandwidth typically between 500 kHz and 100 MHz), linear power amplifier 42, which has a typical maximum available gain of 55 to 60 dB. It is particularly useful if the waveform generator 40 has the capability to generate arbitrary waveforms of any desired shapes that have high frequency harmonics. Very high frequency components are diminished and/or damped due to inherent material properties of the ACIM transducer. Harmonic frequencies up to about 100 MHz are usable in coaxing effects over short ranges of fluid paths.

To induce microcavitation, the waveform 38 produced by generator 40 need not be symmetrical over the time axis 39 of the waveform shown in FIG. 3. The primary waveform should be convertible tone bursts of various duty cycles ranging from about 0.1% to 50%, or even continuous for short duration of intermittent schedule. Waveform generator 40 may be controlled in frequency and/or duty cycle and the amplifier 42 control the amplitude of the tone bursts applied to transducer 20 in order to control the onset and evolution of induced cavitation.

As indicated, coaxing is a mechanism of inducing a phase change as it expropriates a miniscule amount of dissolved gas from the liquid onto a liquid-borne solid particle, however small the particle may be. The gas phase inoculated on the particle is independent of the surface morphology or the material attributes of the solid phase. The gas phase may also include local vaporization of the host liquid itself. This nucleation of the gas seed on the particle can occur even when there are no preexisting crevice trapped gas sites or any bubble precursors present. It is almost a homogeneous nucleation induced or promoted by a local tensile environment and high acceleration field. The frequency-pressure product produced in medium 30 (FIG. 2) which determines the wave associated acceleration must be high enough to ensure around a million-g units of acceleration in the vicinity of a particle. This means the harmonic content and strengths of the waveform produced by generator 40 and amplifier 42 cause transducer 20 to emit acoustic fields such that the frequency-pressure product is almost a uniform value exceeding 5 bar-Mhz in a relatively clean liquid environment.

The duty cycle of waveform 38 should not be 100% because one wants to induce fresh nucleation sites. If the duty cycle is 100% or insonification is of longer duration or continuous, then once the nucleation site is formed it will grow by rectified diffusion, the bubbles will be gassy, and the transient or inertial cavitation is diminished. For energetic ACIM effects, generator 40 should be controlled to induce transient cavitation events involving vacuous or empty cavities imploding. ACIM also will not be effectively brought about by spike pulses of generator 40 because one wants the leading wave pulses to initiate the nucleation ab initio and the following pulses or waves in the tone burst to modulate the inertial cavitation implosion.

High surface tension increases the energy intensity of point ACIM events, and high viscosity of medium 30 (FIG. 2) slows the rate of deposition of energy. The net strength of the implosion is not so much determined by the compressive peak of the driving tone burst 38, but by the converging induced momentum in the medium 30 surrounding the expanding cavities 36 and 37, i.e., the return of the stored inertial effect. Cavitation activity does not occur at all intensities of insonification. There is always a threshold intensity for a given environment below which cavitation does not occur. With ACIM it is possible to lower the threshold or even increase it, and also the cavitation activity above threshold can be controlled.

Medium 30 should be clean i.e. particle free (except the particles inducing the ACIM event) at least in the region 22 where ACIM events are expected. Medium 30 also should be slightly undersaturated at ambient (STP) conditions, and free of any chemicals or surfactants that compromise the surface tension properties. The use of tap water or deionized water as medium 30 has produced good ACIM effects.

Figure 4A:
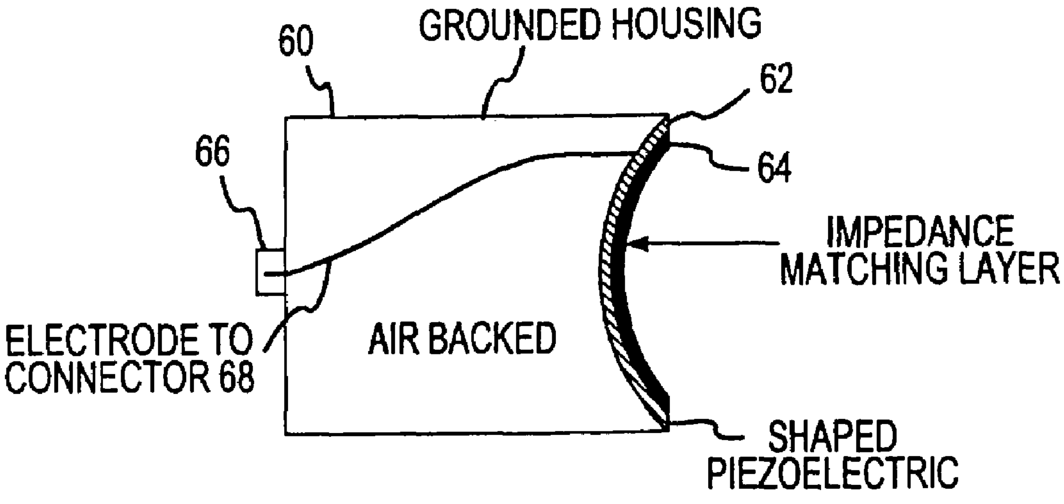
FIG. 4(*a*) is a two-dimensional illustration of a ceramic transducer useful for generating acoustic coaxing fields according to the present invention.
Figure 4B:
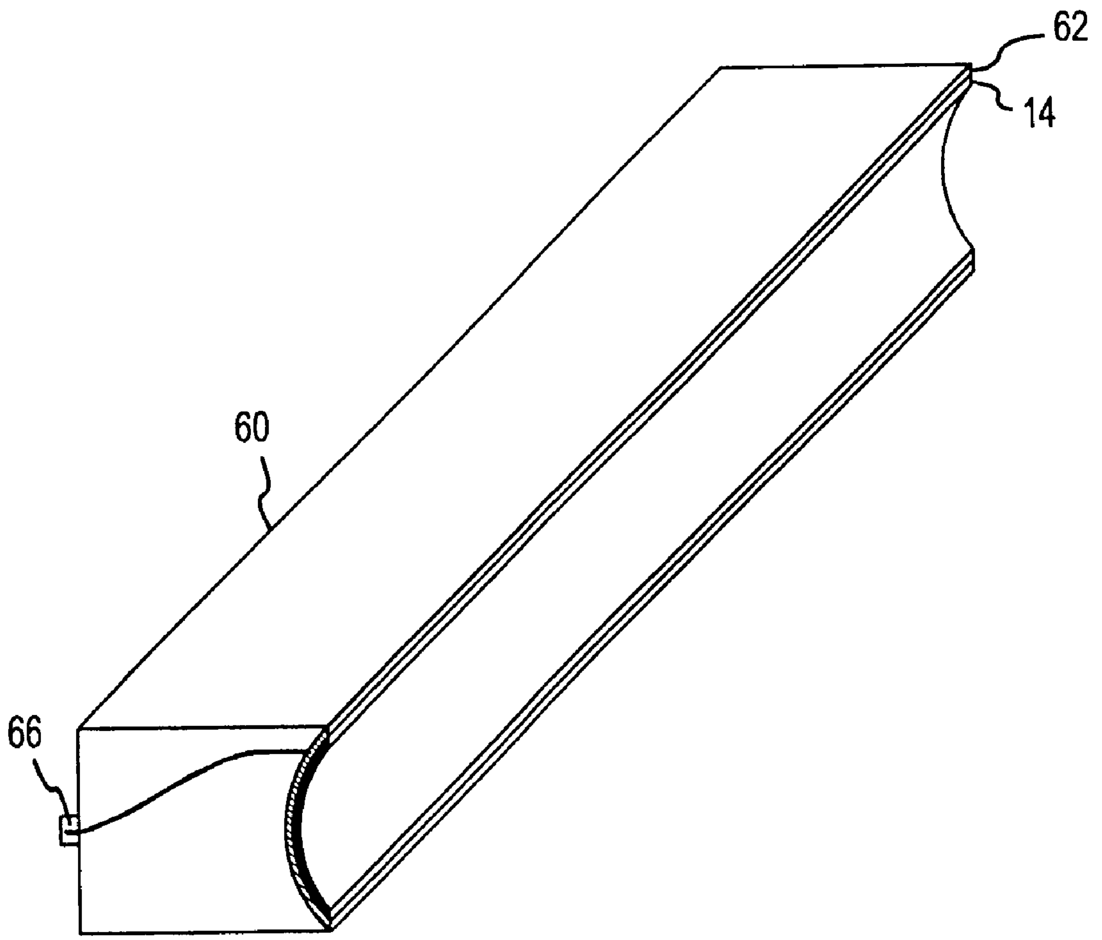

FIG. 4(*a*) shows an exemplary transducer module useful for implementing the methods and apparatuses of the present invention. The transducer module is a low loss, high efficiency, impedance matched, air-backed or re-reflection backed high Q (resonance mode operation) transducer. It has resonant peaks at all odd harmonics of the fundamental frequency. The module comprises a parabolic, spherical section, or hemispherical ceramic transducer 62, a similarly shaped impedance matching layer 64, and air-backed resonator or housing 60 communicating with a rear surface of ceramic transducer 62, and an electrode 66 and conductor 68 that energize the ceramic transducer 62. The transducer module is a custom-design which uses LTZ-1 (Lead Titanate Zirconate) shaped (focused spherical or other shaped segment) piezoelectric ceramic available from Transducer Products, Inc. LTZ-1 is a trade name for the transmitter application PZT. Driven by a square wave, transducer 62 naturally generates all odd harmonics with a 1/N amplitude dependence. One may use quartz, lithium niobate, a composite material, or any high frequency acoustic device.

Instead of being parabolic or spherically shaped, transducer 62 may take on other shapes that preferably focus to concentrate the acoustic field at a site upon the surface of an object. With certain high intensity acoustic fields, or in the presence of a medium having low cavitation threshold, there would be no need to focus or concentrate acoustic energy thereby permitting the transducer to have any suitable shape, e.g., flat surface, to induce microcavitation. A spherical section transducer 62 having a 6" radius, for example, may produce an ACIM area of about 40-50 square millimeters and a "depth-of-field" of about 2.0 to 5.0 mm where cavitation is most prominent, e.g., at or above its −6 dB nominal intensity level. At sufficiently high ACIM driving intensity, the cavitation threshold may be exceeded in regions of insonification other than the focal region of transducer 62 thereby achieving ACIM effects in larger volumes of the medium. The size and location of cavitation is defined by transducer geometry, whereas the duty cycle and amplifier gain define the intensity of cavitation at that location. Surprisingly, the focal length may be relatively long since medium 30, e.g., water, transmits acoustic energy fairly well. In addition, the transducer module may be elongated or formed as a cylindrical section, as illustrated in FIG. 4(*b*), to establish a linear acoustic field, which is more useful for cleaning planar substrates (e.g., a sheet of paper or a painted panel) in a sweeping action. In FIG. 4(*b*), the elongated transducer module comprises an air-backed chamber 60, a ceramic transducer 62, an impedance-matching layer 64, and an electrode 66 for energizing the transducer 62. A spherical or cylindrical, elongated module produces a linear ACIM field along an axis in front of the module at a distance equal to a radius r or focal length of the transducer. When deployed in a cleaning device, the linear field is swept across the surface of a substrate (e.g., paper or wafer) by moving either the transducer or the substrate. It follows that the geometry, physical dimensions, configurations, or other parameters of transducer 62 may be varied to meet the requirements of any scientific, medical, or industrial application.

An impedance matching layer is often used to improve transmission and coupling of acoustic energy to the medium. In an optional embodiment of the invention, impedance matching layer 64, if used, may comprise a variety of materials whose property are dictated by the tensile strengths and damping characteristics of the transducer and the insonification medium 30. In one embodiment, polyurethane or other polymeric material is employed. The thickness of the layer 64 is chosen to be about one-quarter wavelength of the acoustic field generated in the medium in order to reduce reflection losses, which serves to optimize the exchange acoustic energy between transducer 62 and insonification medium 30.

Figure 5:
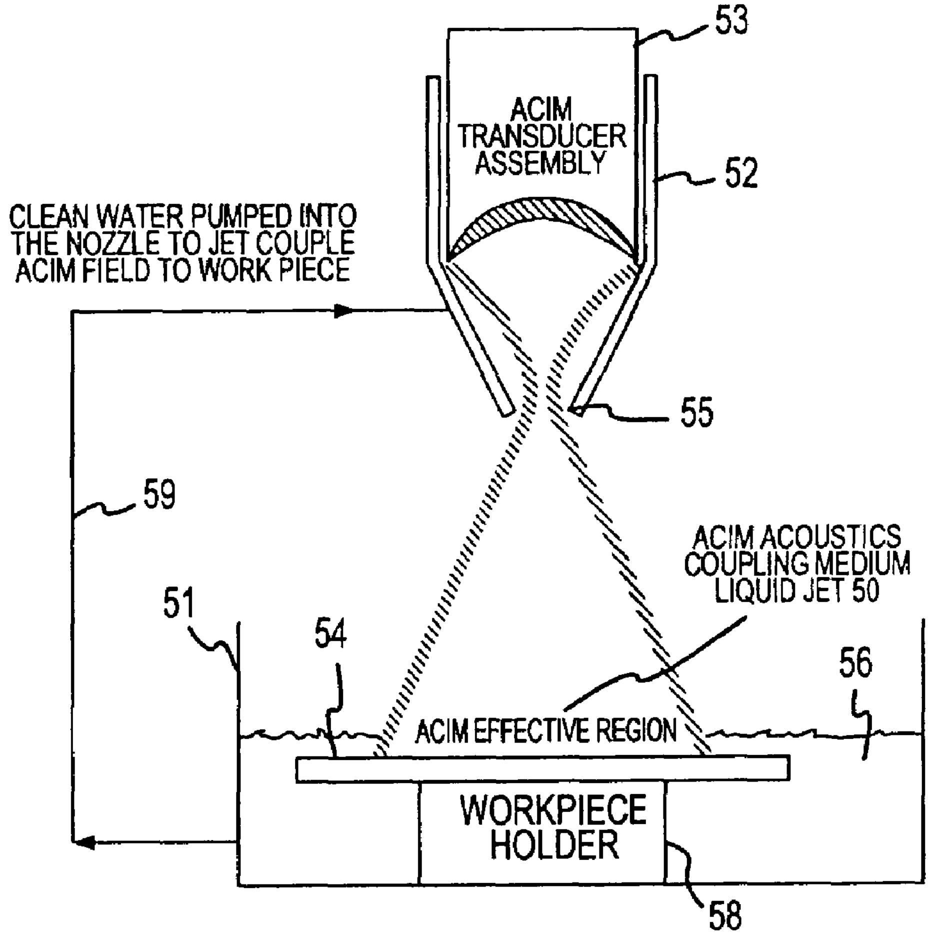
FIG. 5 depicts an exemplary apparatus for subjecting a workpiece or surface to ACIM fields according to the present invention.

FIG. 5 illustrates another embodiment of an ACIM cleaning or surface treatment system where cavitation region 50 about the surface of a workpiece 54 lies beneath a transducer module 53. Transducer module 53, as previously described in connection with FIG. 4, is disposed within a nozzle 52 which includes a jet 55 through which liquid medium 56 flows when pumped or otherwise transferred to chamber 57 via conduit 59 from the reservoir of tank 51 or external source. Medium 56 need not be recirculated through conduit 59, as shown in FIG. 5 or elsewhere in this description, but may instead be continuously fed from a fresh external source. The system of FIG. 5 provides acoustic coupling between the transducer and the ACIM region 50. The flow of fluid 56 maintains an acoustic communication path between chamber 57 and ACIM region 50 so that the ACIM field generated by the transducer module 53 in the chamber 57 is directed through the jet 55 onto the surface of workpiece 54. Workpiece 54 may, for example, be a semiconductor wafer or other substrate immersed within a fluid medium 56 of de-ionized water, for example. A holder or platen 58 supports the substrate so that its surface lies in the effective ACIM region 50. In a practical application, platen 58 may spin, oscillate, or laterally move the workpiece 54 across region 50 to expose the entire surface to the ACIM region. Alternatively, the module 52 may be swept across the surface of workpiece 54.

Again, the nozzle 52 may take on a variety of geometries. The distance between nozzle 52 and workpiece 54 may range from a few millimeters to several centimeters or more, as desired, depending on the application so long as acoustic coupling is maintained.

Figure 6:
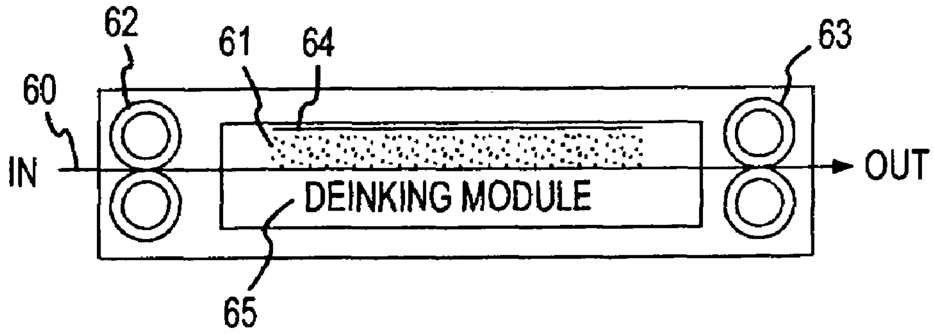
FIG. 6 depicts an exemplary apparatus for deinking paper or other planer substrates using ACIM methods according to the present invention.

FIG. 6 shows an ACIM arrangement useful for deinking paper. In operation, a sheet of paper 60 is de-inked as it is pulled through an insonification medium 65 by roller pairs 62, 63 across an ACIM field 61 generated by a transducer module 64 disposed above the paper 60. Instead of being located above the paper, module 64 may be located beneath the paper 60 or at any angular orientation with respect to the paper. Multiple transducer modules 64 may be deployed and/or the depth of field of such transducer modules may be staggered in order to provide serial, in-line stations for more effective de-inking or cleaning. Alternatively, in case of pulp deinking, for example, the pulp can be pumped through a pipe or conduit having ACIM transducers disposed on the internal wall thereof. This permits bulk processing of large quantities of pulp. Slurries other than pulp may be similarly processed using ACIM.

Figure 7:
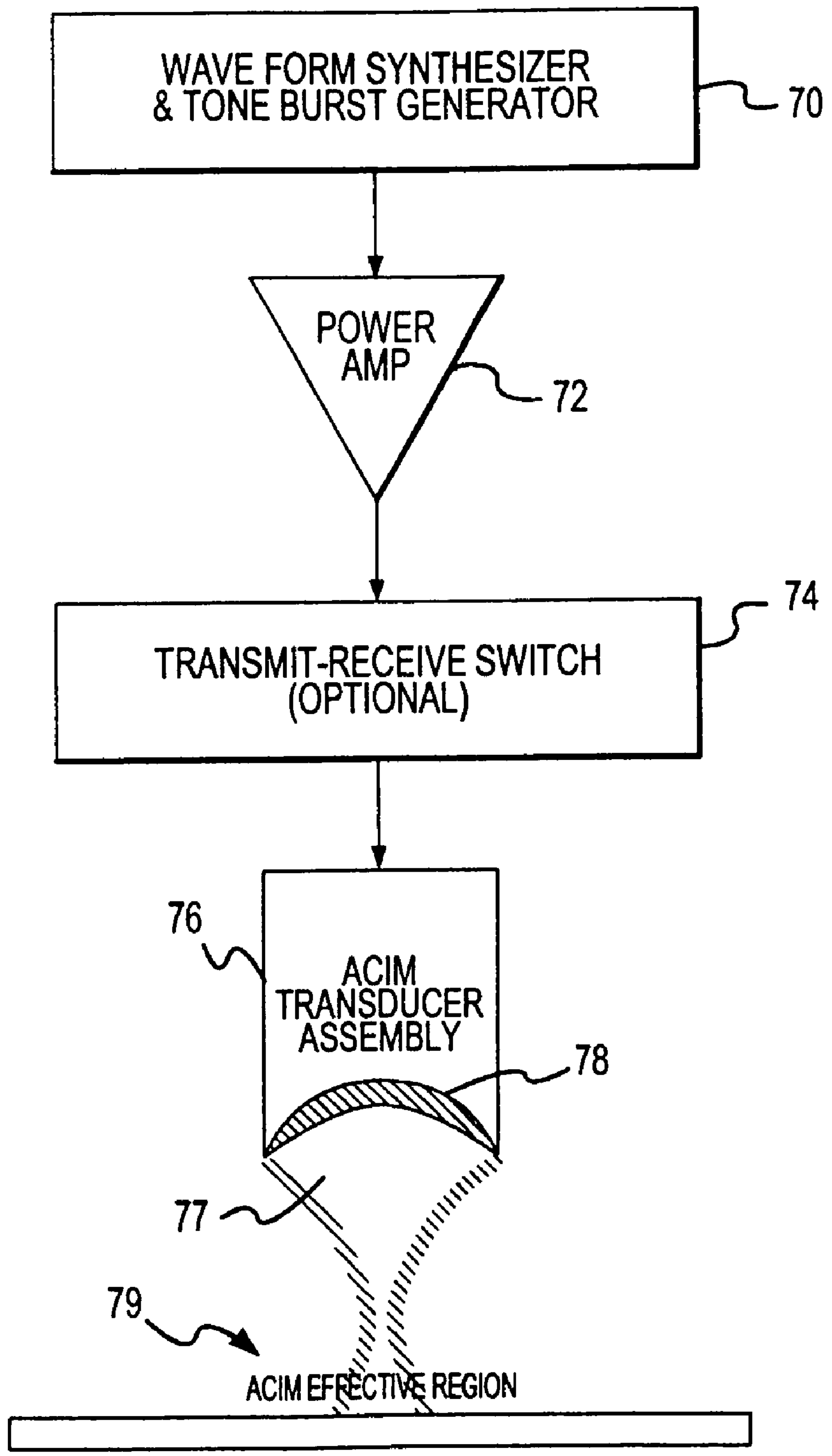
FIG. 7 illustrates an exemplary ACIM method carried out by the present invention.

FIG. 7 illustrates a method of acoustic coaxing induced microcavitation. The method comprises providing a transducer module 76 that generates an ACIM field 77 using a single transducer 78, providing a waveform generator 70 that produces tone bursts having a given or controllable duty cycle and frequency, amplifying the output of the waveform generator 70 by an amplifier 72, optionally switching the output of the amplifier 72 using a on-off (transmit-receive) switch 74 before supplying the same to the transducer module 76, directing the transducer to an ACIM region 79 on an object, and providing acoustic coupling through an acoustic transmission medium between the transducer 78 and ACIM region 79 during microcavitation. When the transmit switch is on, the ACIM field is activated whereas, when the receive switch is on, a detector (e.g., passive detector 19 (FIG. 1(*b*) or even the ACIM transducer itself could act as a detector in receive mode), is activated to receive echoes. The transmit/receive switch operates mutually exclusively.

The method may be modified by sweeping the ACIM field across the object by moving the object or the transducer, providing square wave tone bursts of about one 1 MHz with a burst repetition frequency of about 1 KHz, varying or controlling the duty cycle of the tone bursts, varying or controlling the gain of the amplifier 72, enhancing the acoustic coupling medium with cavitation nuclei, providing a transducer having an elongated shape for producing a linear ACIM region, providing an array of ACIM transducers, and/or providing an ACIM transducer to perform a useful operation including, but not limited to, abrasion, cutting, drilling, lapping, polishing, machining, inducing a chemical reaction, measuring and testing, surface or thin film treatment, paint removal, deinking, surface erosion, wafer cleaning, surgery, submicron particle detection or eviction, or any other useful purpose. Multiple transducers may also be provided in communication with a common or multiple insonification chambers. Based on the description of the apparatus set forth above, various other apparatuses may be constructed to carry out the stated methods.

The invention is also useful for thin film analysis. Binding or adhesion strength, for example, can be easily determined by observing the time required to remove a patch of the film by ACIM of a given intensity. A plot of film residence time versus insonification pressure amplitude has an inverse reverse relationship which can be used to determine binding or adhesion strength of the film to the substrate, or to determine substrate erosion strength—the extrapolated intersection with the pressure axis directly corresponds with the spontaneous removal time of the thin film, and hence determines the binding or adhesion strength.

In view of the above teachings, it is apparent that single-transducer ACIM methods and apparatuses, as a core technology, may be used to perform various useful scientific, medical and industrial tasks with respect to an object, a substance, or as an investigatory tool for measuring and testing. Methods and the design of apparatuses for carrying out the methods can be configured or constructed to match the specific needs encountered in which microcavitation is used, constructively or destructively. The single-transducer teachings set forth above provide distinct advantages over dual low and high frequency transducers for ACIM in terms of the design or construction of a nozzle, platen, transducer shape, work tool and/or transducer head design. Multiple single-transducer modules may be ganged together or arrayed in a common or in separate fluid reservoirs. Various waveforms or combination of waveforms having high and low frequency components, other than those described herein, can be applied to the single-transducer to effect ACIM in addition to square or triangular wave tone bursts. Various materials for impedance matching layers may be deployed. Thus, the description of the illustrative embodiments should not be considered limiting of the invention. By the appended claims, it is the intent to include all such modifications and adaptation that may come to those skilled in the art based on the teachings herein.

The invention claim is:

1. An apparatus that produces cavitation in a liquid medium comprising:

(a) at least one concaved transducer module that produces acoustic field emissions, (b) a source of power that powers the transducer with a bi-polar, inharmonic tone burst waveform having a duty cycle that provides on and off burst intervals, said source of power being applied to said transducer module to produce in said medium a cavitation region having multiple high frequency and multiple lower frequency acoustic field components, and (c) a supporting mechanism to support said transducer module in communication with said liquid.

2. The apparatus as recited in claim 1 wherein said bi-polar inharmonic tone burst waveform comprises bursts of square waves superimposed on a bi-polar square wave.

3. The apparatus as recited in claim 2, further comprising a controller that controls at least one of duty cycle, amplitude, tone burst repetition rate, and frequency of said waveform in accordance with a desired level of cavitation.

4. The apparatus as recited in claim 3, wherein said supporting mechanism comprises a nozzle that supports said transducer module in a chamber that is supplied with a liquid insonification medium.

5. The apparatus as recited in claim 4, further comprising a microcavitation detector wherein said detector provides feedback control to enable said controller to maintain a desired level of induced microcavitation.

* * * * *